(12) United States Patent
Akaba et al.

(10) Patent No.: US 12,420,868 B2
(45) Date of Patent: Sep. 23, 2025

(54) REAR STRUCTURE OF VEHICLE BODY

(71) Applicant: Honda Motor Co., Ltd., Tokyo (JP)

(72) Inventors: Yuya Akaba, Tokyo (JP); Shungo Chino, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 18/179,330

(22) Filed: Mar. 6, 2023

(65) Prior Publication Data
US 2023/0311992 A1 Oct. 5, 2023

(30) Foreign Application Priority Data
Mar. 31, 2022 (JP) .................................. 2022-058971

(51) Int. Cl.
| | |
|---|---|
| B62D 21/03 | (2006.01) |
| B62D 21/11 | (2006.01) |
| B62D 25/16 | (2006.01) |
| B62D 25/20 | (2006.01) |
| B62D 27/00 | (2006.01) |

(52) U.S. Cl.
CPC .............. B62D 21/03 (2013.01); B62D 21/11 (2013.01); B62D 25/16 (2013.01); B62D 25/20 (2013.01); B62D 27/00 (2013.01)

(58) Field of Classification Search
CPC ........ B62D 21/03; B62D 21/09; B62D 21/11; B62D 25/16; B62D 25/20; B62D 25/2027; B62D 27/00
See application file for complete search history.

(56) References Cited

U.S. PATENT DOCUMENTS

2020/0102014 A1* 4/2020 Sakai ..................... B62D 21/07
2021/0031834 A1* 2/2021 Takeda ............... B62D 25/2036

FOREIGN PATENT DOCUMENTS

| DE | 102013021504 A1 | * | 7/2014 | ............ B62D 21/11 |
| JP | 2016064701 A | * | 4/2016 | ............ B62D 21/09 |
| JP | 2018114785 | | 7/2018 | |
| JP | 7020220 B2 | * | 2/2022 | ............ B62D 25/16 |
| WO | WO-2017217117 A1 | * | 12/2017 | ............ B62D 21/11 |

* cited by examiner

*Primary Examiner* — Lori Lyjak
(74) *Attorney, Agent, or Firm* — JCIPRNET

(57) ABSTRACT

Provided is a rear structure of vehicle body, including a floor panel constituting a floor portion at a rear portion of a vehicle body; a rear side frame extending in a front-rear direction of the vehicle body outside the floor panel in a vehicle width direction; and a subframe installed below the floor panel and supporting suspension components. The rear side frame includes a subframe fastening portion to which the subframe is fastened, and the subframe fastening portion links the rear side frame and the floor panel.

8 Claims, 7 Drawing Sheets

View taken along B-B

REAR STRUCTURE OF VEHICLE BODY

CROSS-REFERENCE TO RELATED APPLICATION

This application claims the priority benefits of Japanese application no. 2022-058971, filed on Mar. 31, 2022. The entity of the above-mentioned patent application is hereby incorporated by reference herein and made a part of this specification.

BACKGROUND

Technical Field

The disclosure relates to a rear structure of vehicle body.

Related Art

Conventionally, as a structure for mounting a subframe or the like that supports devices such motors and engines or structures such as suspensions to a body of a vehicle body, there is a structure shown in Patent Literature 1 (JP 2018-114785), for example. In the structure of Patent Literature 1, a fastening member that supports a motor in a front-rear direction of the vehicle in a state of being fastened to an upper cross member is provided to ensure the support rigidity for a motor unit.

However, in recent years, due to the spread of electric vehicles and hybrid vehicles, more and more vehicles are equipped with large batteries. When installing a large battery etc. on a vehicle body, considering the layout with other devices, there is a possibility that support members such as a subframe cannot be mounted to a cross member on the body side. In that case, it may be difficult to ensure sufficient support rigidity for a device supported by a subframe or the like, and eventually difficult to ensure strength required at a rear portion of the vehicle body.

In view of the above problems, an object of the disclosure is to provide, with a simple configuration, a rear structure of vehicle body capable of ensuring strength required at the rear portion of the vehicle body and effectively improving connection strength of the subframe, thereby improving the safety of vehicle traffic and suppressing deterioration in the smoothness of traffic.

SUMMARY

A rear structure of vehicle body according to the disclosure includes a floor panel (3) constituting a floor portion (2) at a rear portion of a vehicle body (1); a rear side frame (10) extending in a front-rear direction of the vehicle body (1) outside the floor panel (3) in a vehicle width direction; and a subframe (5) installed below the floor panel (3) and supporting suspension components of the vehicle body. The rear side frame (10) includes a subframe fastening portion (60) to which the subframe (5) is fastened, and the subframe fastening portion (60) links the rear side frame (10) and the floor panel (3).

DESCRIPTION OF THE EMBODIMENTS

Figure 1:
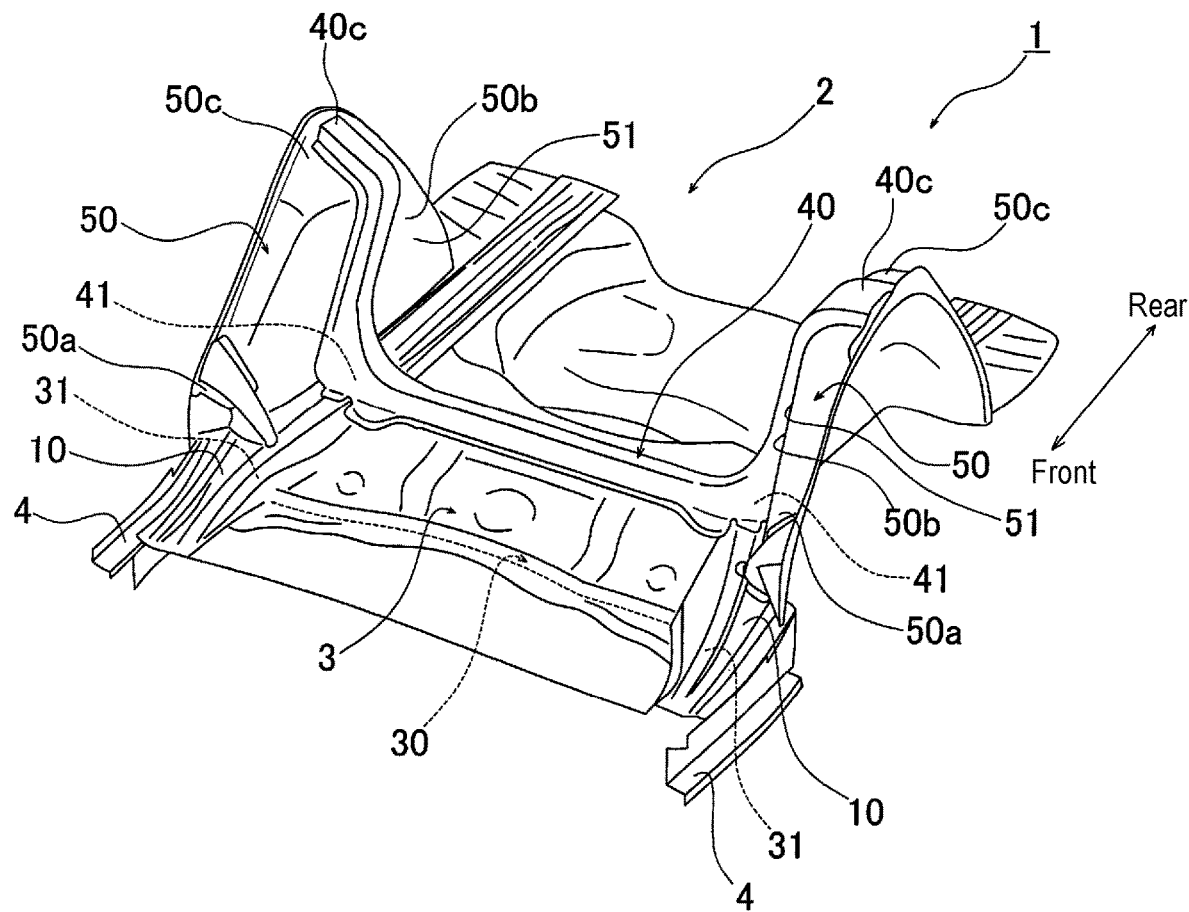
FIG. 1 is a schematic perspective view of a floor portion at a rear portion of a vehicle body to which a rear structure of vehicle viewed from above according to an embodiment of the disclosure is to be applied.

According to the rear structure of vehicle body of the disclosure, the rear side frame and the floor panel is linked by the subframe fastening portion of the rear side frame, such that a load input from the subframe to the rear side frame can be distributed to the rear side frame and the floor panel by this subframe fastening portion. Therefore, the connection strength of the subframe can be effectively improved, and the strength required at the rear portion of the vehicle body can be ensured.

Moreover, in the disclosure, a wheel house (50) disposed outside the rear side frame (10) in the vehicle width direction; and a cross member (40) extending inward in the vehicle width direction from the wheel house (50) on an upper surface side of the floor panel (3) may be provided, and the subframe fastening portion (60) is joined to the cross member (40) via the floor panel (3).

According to this configuration, the subframe fastening portion is joined to the cross member extending inward in the vehicle width direction from the wheel house, such that the load input from the subframe can be distributed to the cross member, and the connection strength of the subframe can be further improved.

Further, in the disclosure, the subframe fastening portion (60) includes a first link member (61) that links an inner side wall portion (13) of the rear side frame (10) in the vehicle width direction and the floor panel (3).

According to this configuration, the first link member that links the rear side frame and the floor panel is provided, such that the load input from the subframe to the rear side frame can be distributed to the floor panel via the first link member, and the load input to the rear side frame can be transmitted to the cross member and floor panel. Therefore, displacement of the rear side frame in the same direction (tilting inward in the vehicle width direction) can be suppressed against the load applied to the rear side frame inward in the vehicle width direction, thus the connection strength of the subframe can be effectively improved.

Further, in the disclosure described above, the subframe fastening portion (60) may include a second link member (62) installed to straddle a lower side wall portion (14) of the rear side frame (10) and the first link member (61).

According to this configuration, the second link member disposed to straddle the lower side wall portion of the rear side frame and the first link member is provided, such that the load input from the subframe can be distributed to the first link member and the rear side frame by the second link member, and the connection strength of the subframe can be further improved.

Moreover, in the above disclosure, the first link member (61) is linked to the inner side wall portion (13) and the lower side wall portion (14) of the rear side frame (10), and may have a shape in which a width dimension in the front-rear direction decreases inward in the vehicle width direction from the rear side frame (10).

According to this configuration, in addition to having a shape in which the width dimension in the front-rear direction gradually decreases inward in the vehicle width direction, the first link member is linked to the inner side wall portion and the lower side wall portion of the rear side frame, such that the load input from the subframe can be distributed, and a load input from the rear side frame to the first link member can be efficiently transmitted to the cross member and the floor panel. Thus, displacement of the rear side frame in the same direction (tilting inward in the vehicle width direction) can be suppressed more effectively against the load applied to the rear side frame inward in the vehicle width direction, thus the connection strength of the subframe can be further effectively improved.

Further, in the disclosure, the second link member (62) may be linked to the first link member (61), and may be linked to the lower side wall portion (14) and an outer side wall portion (12) in the vehicle width direction of the rear side frame (10).

According to this configuration, the second link member is linked to the first link member and linked to the lower side wall portion of the rear side frame and the outer side wall portion in the vehicle width direction, such that the load input from the subframe to the second link member can be distributed to a first link member and the rear side frame, and the connection strength of the subframe can be further improved.

Moreover, in the disclosure described above, a first ridgeline (61a) provided on the first link member (61); and a second ridgeline (62a) provided on the second link member (62) and extending from the subframe fastening surface (62b) in the subframe fastening portion (60) to the floor panel (3) may be provided, and the first ridgeline (61a) and the second ridgeline (62a) may be disposed to be continuous with each other.

According to this configuration, the second ridgeline extending from the subframe fastening surface of the second link member to the floor panel is disposed to be continuous with the first ridgeline of the first link member, such that the load input from the subframe can be smoothly transmitted to the first link member and the cross member, and the connection strength of the subframe can be further improved.

Moreover, in the disclosure described above, a reinforcement frame (80) positioned inward than the subframe fastening portion (60) in the vehicle width direction may be provided, and the reinforcement frame (80) may extend in the front-rear direction of the vehicle body (1) and intersect the cross member (40).

According to this configuration, the reinforcement frame positioned inward than the subframe fastening portion in the vehicle width direction is provided, and the reinforcement frame extends in the front-rear direction of the vehicle body and intersects the cross member, such that the load from the subframe input to the cross member can be transmitted to the reinforcement frame, thus the connection strength of the subframe can be further improved.

It should be noted that the above numerals in parentheses indicate the drawing reference numbers of corresponding constituent elements in the embodiments described later, for reference.

According to the disclosure, with a simple configuration, the connection strength of the subframe can be effectively improved. By providing the rear structure of vehicle body that can ensure the strength required at the rear portion of the vehicle body, deterioration in the smoothness of traffic can be suppressed the safety of vehicle traffic can be improved.

Hereinafter, embodiments of the disclosure will be described in detail with reference to the accompanying drawings. In the following description, "front" and "rear" refer to the forward direction of a vehicle body (vehicle) or the rearward direction of the vehicle, which will be described later. Further, "left" and "right" refer to left and right in the vehicle width direction, respectively, when the vehicle body (vehicle) faces the forward direction (front side). Moreover, "up" and "down" refer to the up-down direction (vertical up-down direction) of the vehicle body (vehicle).

Figure 2:
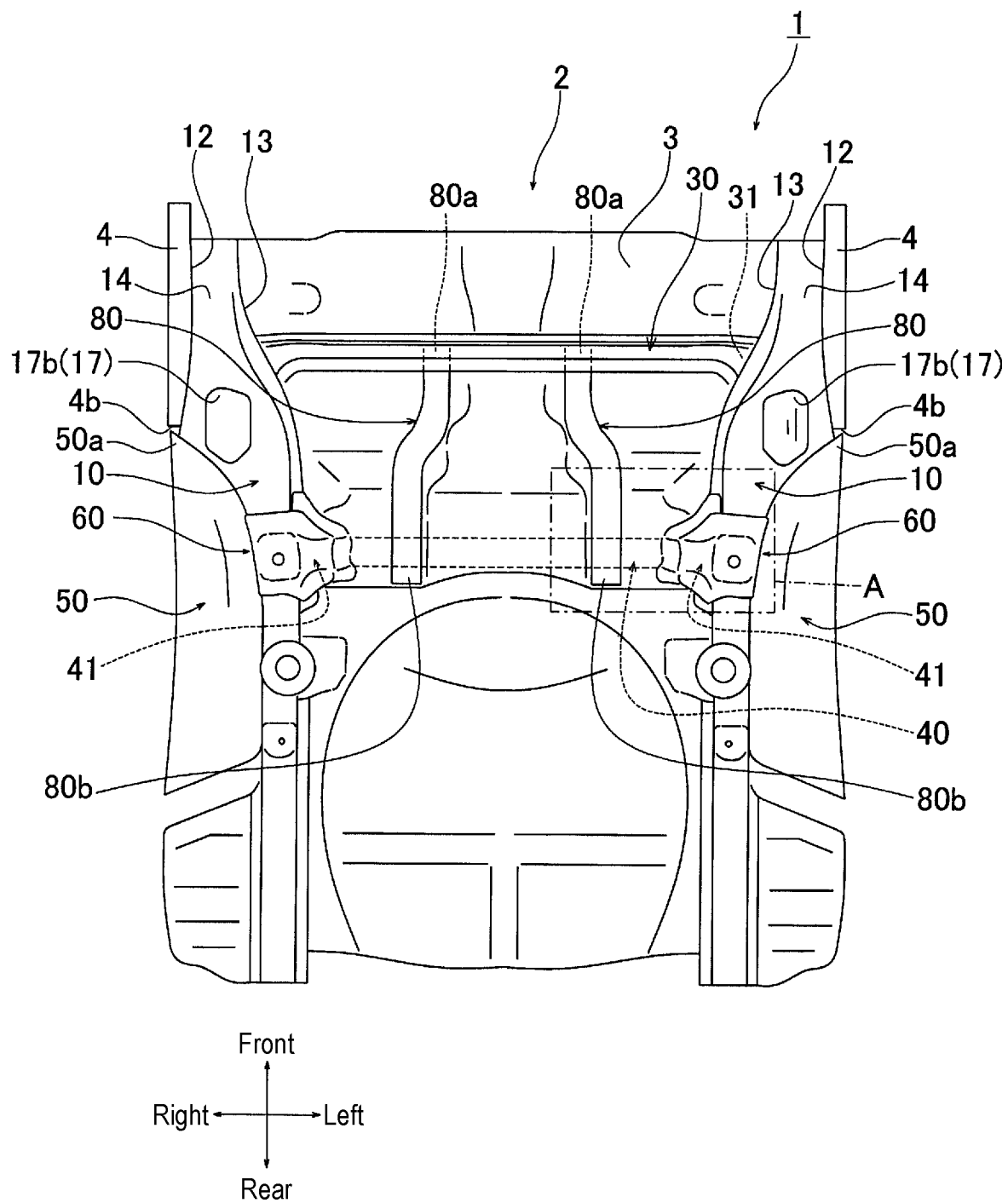
FIG. 2 is a schematic lower view (bottom view) of a floor portion at a rear portion of the vehicle body viewed from a lower surface side.

FIG. 1 and FIG. 2 are views showing a floor portion at a rear portion of a vehicle body to which a rear structure of vehicle according to an embodiment of the disclosure is to be applied. FIG. 1 is a schematic perspective view of a floor portion viewed from above. FIG. 2 is a schematic lower view (bottom view) of a floor portion viewed from a lower surface side. As shown in these figures, a vehicle body 1 of this embodiment includes a floor portion 2 provided at a rear portion of the vehicle body 1; a pair of rear side frames 10, 10 extending in a front-rear direction of the vehicle body 1 outside the floor portion 2 in a vehicle width direction; a front cross member 30 linked between the pair of rear side frames 10, 10 and extending inward in the vehicle width direction; a rear cross member 40 linked between the pair of rear side frames 10, 10 at a position rearward than the front cross member 30 and extending inward in the vehicle width direction; and a rear floor panel 3 forming a bottom surface of the floor portion 2 between the pair of rear side frames 10, 10.

Rear wheel houses 50, 50 for housing rear wheels (rear tires) (not shown) are provided outside the pair of rear side frames 10, 10 in the vehicle width direction, respectively. The rear wheel house 50 includes a bulging portion 51 having a curved surface shape that covers an outer shape of the rear tire and bulges inward in the vehicle width direction.

The front cross member 30 is linked to a side surface (inner surface) of an inner side wall 13 of the rear side frame 10 at a front side link portion (first link portion) 31 provided at a position forward than a front end portion 50a of the rear wheel house 50 in the rear side frame 10, and connects the left and right rear side frames 10, 10 in the vehicle width direction. Moreover, the rear cross member 40 is linked to the side surface (inner surface) of the inner side wall 13 of the rear side frame 10 at a rear side link portion (second link portion) 41 provided at a position on the inner side of the rear wheel house 50 in the rear side frame 10, and extends further upward from the rear side link portion 41 along an inner surface 50b (inner wall of the bulging portion 51) of the rear wheel house 50, and two end portions 40c, 40c thereof reach upper end portions 50c, 50c of the rear wheel houses 50, 50, respectively. Therefore, the rear cross member 40 connects the left and right rear side frames 10, 10 together, and also connects the left and right rear wheel houses 50, 50 together. Moreover, the rear side frame 10 and the rear wheel house 50 that are adjacent in the vehicle width direction are also linked by the rear cross member 40.

Further, as shown in FIG. 2, a pair of reinforcement frames 80, 80 extending in the front-rear direction of the vehicle body 1 are provided at a position inward than the rear side frames 10, 10 in the vehicle width direction. The reinforcement frame 80 has a front side end portion 80a joined to the front cross member 30 (via the rear floor panel 3) by welding below the rear floor panel 3, and a rear side end portion 80b joined to the rear cross member 40 (via the rear floor panel 3) by welding. Thereby, the reinforcement frame 80 intersects and is jointed to the front cross member 30 and the rear cross member 40.

Since the pair of left and right rear side frames 10, 10, the rear wheel houses 50, 50, and subframe fastening portions 60, 60, which will be described later, have symmetrical shapes and configurations, in the following description, one rear side frame 10, one rear wheel house 50, and one subframe fastening portion 60, and the like will be described.

The rear side frame 10 includes an outer wall 12 that forms an outer side wall portion in the vehicle width direction; the inner side wall 13 that forms an inner side wall portion in the vehicle width direction; a bottom wall (lower wall) 14 that forms a bottom portion (bottom surface); and an upper wall (not shown) that forms an upper portion (upper surface), and is configured as a closed cross section with a substantially rectangular (substantially squared) shape longitudinal cross section viewed from the front-rear direction. Moreover, the outer wall 12 of the rear side frame 10 positioned rearward than the front end portion 50a of the rear wheel house 50 is composed of the inner surface 50b of the rear wheel house 50 (inner wall of the bulging portion 51), and the outer wall 12 of the rear side frame 10 positioned forward than the front end portion 50a of the rear wheel house 50 is composed of an inner side surface of a side sill 4. The side sill 4 is an elongated member extending in the front-rear direction on both sides of the vehicle body in front of the rear wheel house 50, and a rear end portion 4b thereof is disposed at a position facing the front end portion 50a of the rear wheel house 50. Therefore, the side sill 4 extends in the front-rear direction with the rear end portion 4b and its vicinity outside the rear side frame 10.

Further, as shown in FIG. 2, the rear side frame 10 is provided with an arm mounting portion 17 for mounting a trailing arm (not shown). The arm mounting portion 17 is formed with a recess portion 17b that is open to a lower surface side (lower surface of the rear side frame 10) and recessed upward. Components of the trailing arm are linked in the recess portion 17b. The arm mounting portion 17 is disposed at a position aligned with the front end portion 50a of the rear wheel house 50, the rear end portion 4b of the side sill 4, and the front side link portion 31 in the vehicle width direction of the rear side frame 10.

Figure 3:
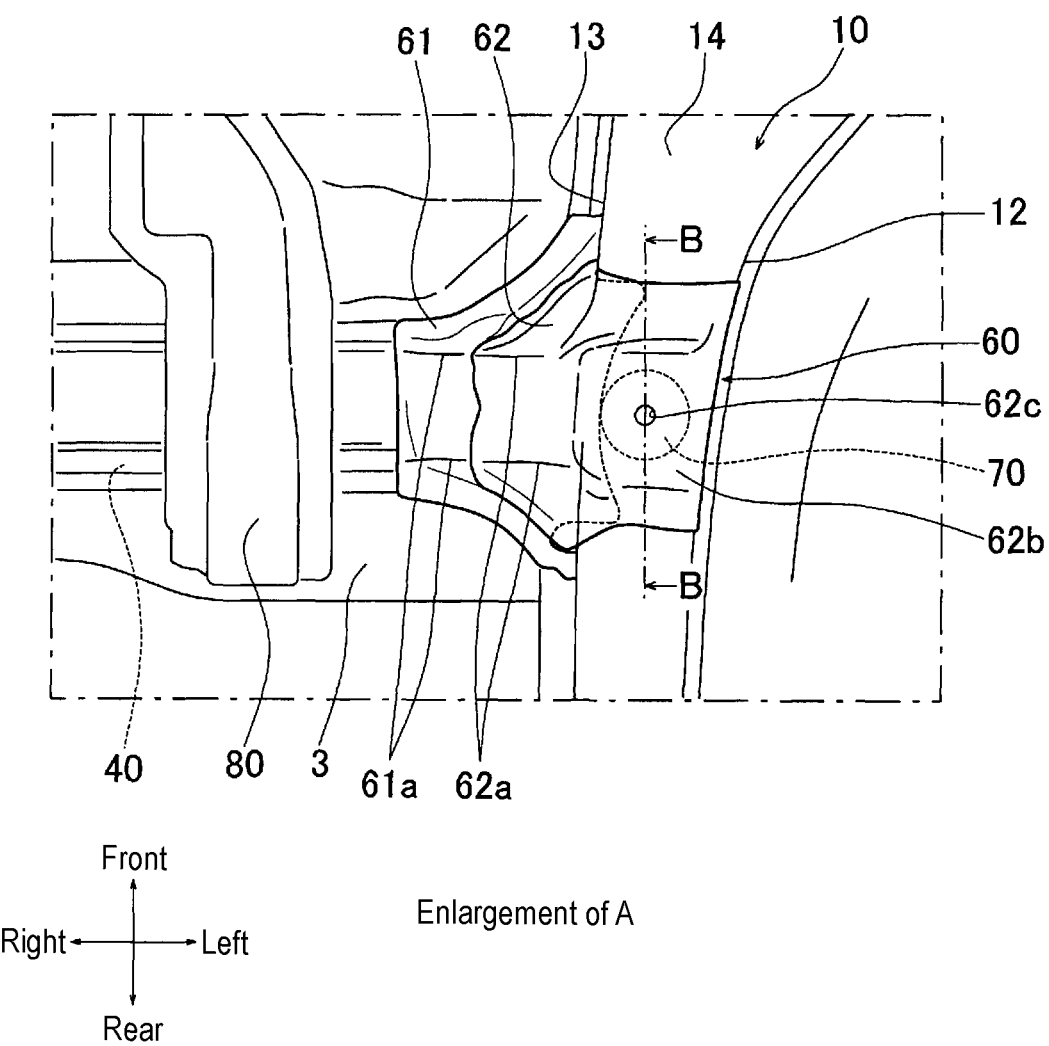
FIG. 3 is a partially enlarged view of a portion A of FIG. 2.
Figure 4:
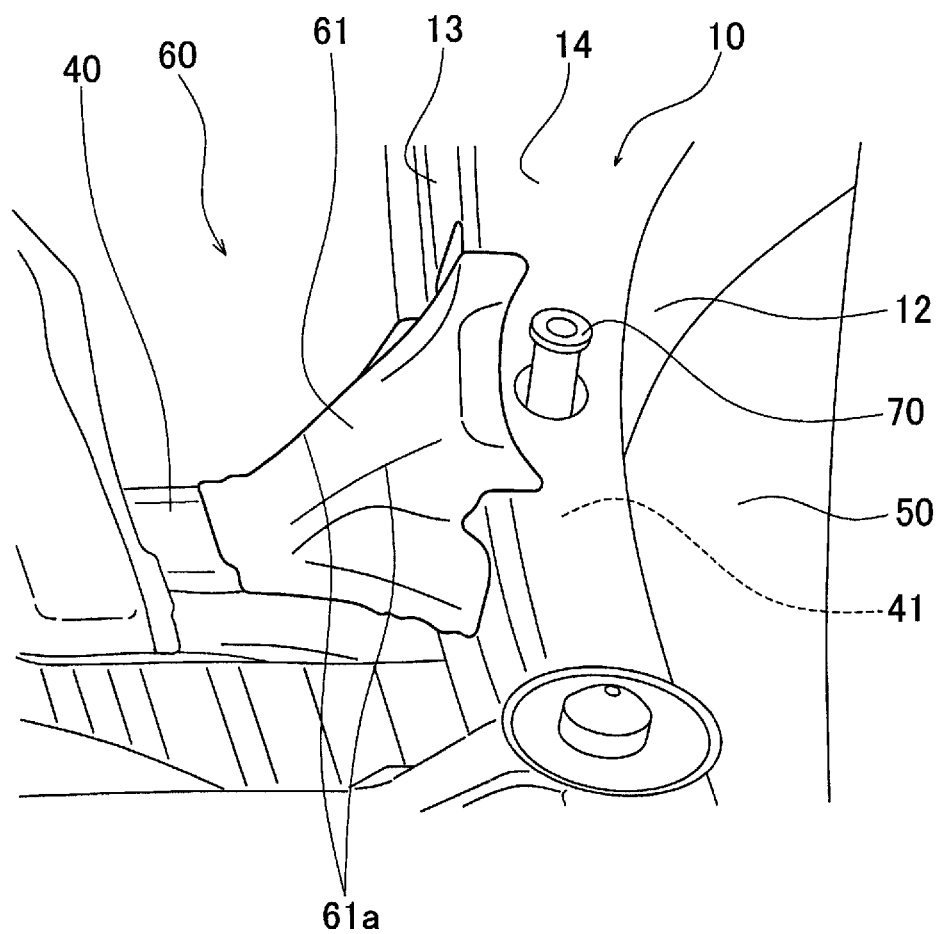
FIG. 4 is a perspective view showing a subframe fastening portion, omitting the illustration of a second link member.
Figure 5:
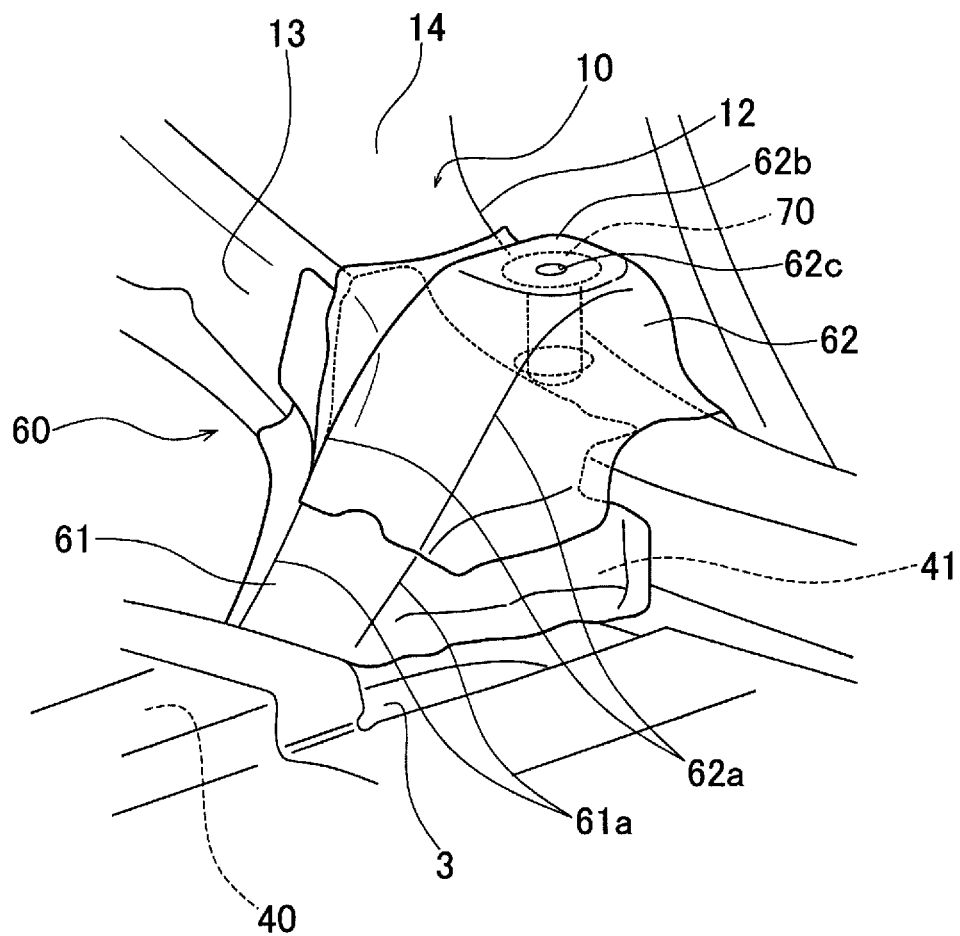
FIG. 5 is a perspective view showing a subframe fastening portion.
Figure 6:
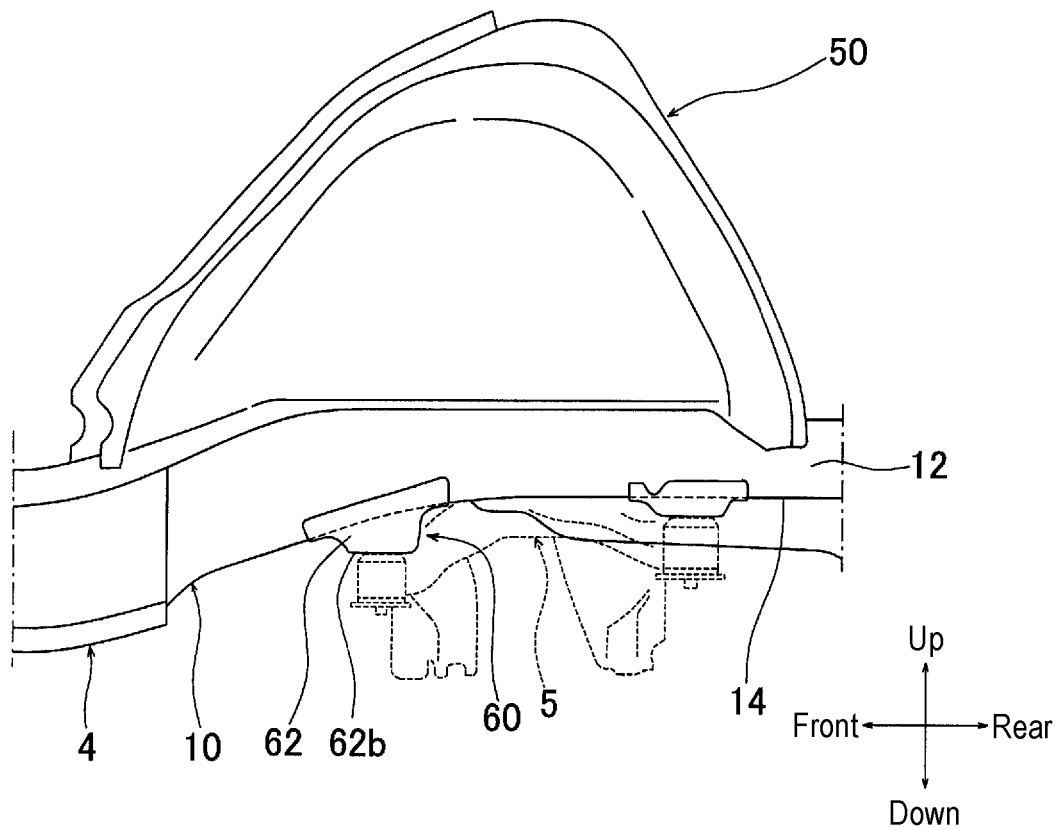
FIG. 6 is a view of a floor portion at a rear portion of the vehicle body viewed from a side.
Figure 7:
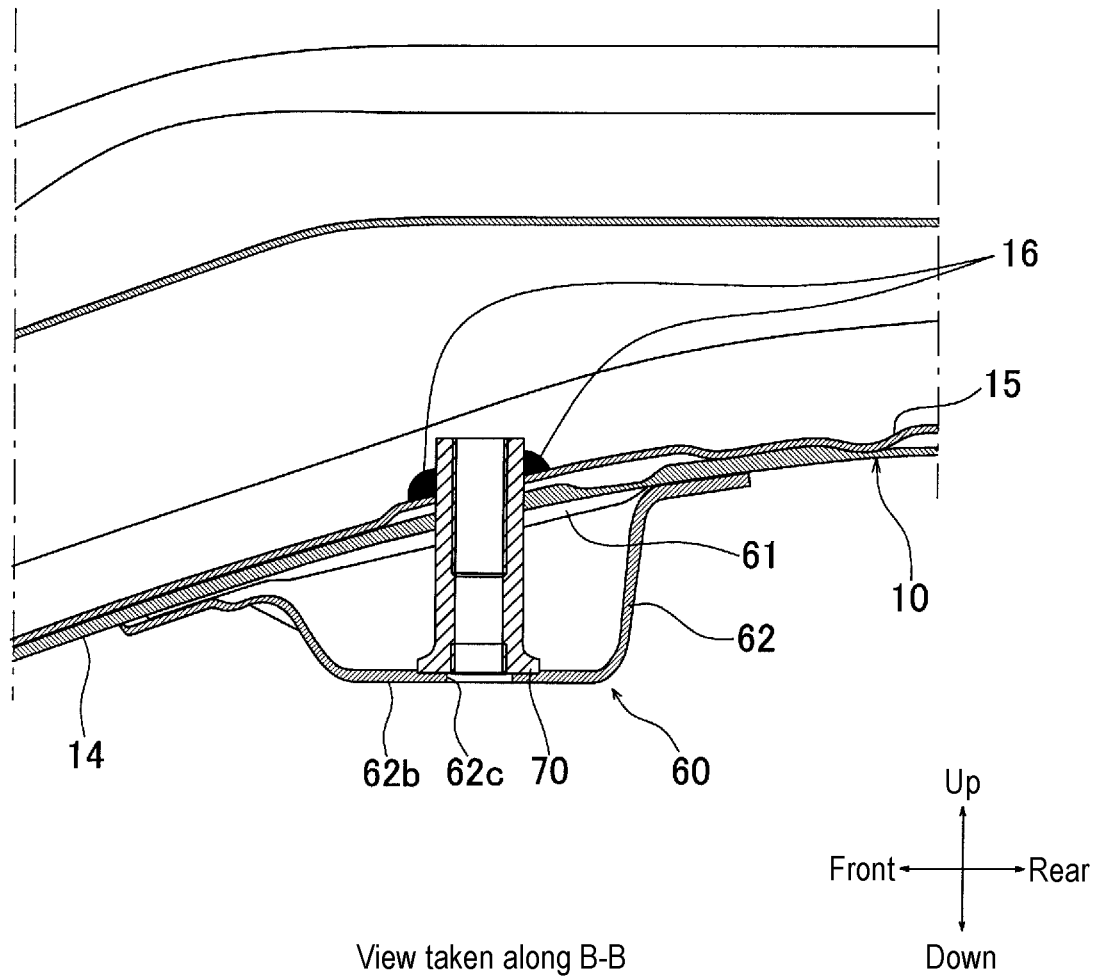
FIG. 7 is a view showing a cross section of a subframe fastening portion and a view showing a cross section taken along B-B in FIG. 3.

A subframe 5 (see FIG. 6) that supports suspension components is installed below the rear floor panel 3, and the rear side frame 10 is provided with the subframe fastening portion 60 to which the subframe 5 is fastened. FIGS. 3 to 5 are views showing the subframe fastening portion. FIG. 3 is a partially enlarged view of a portion A in FIG. 2, and FIGS. 4 and 5 are perspective views showing the subframe fastening portion. FIG. 6 is a view of a floor portion at a rear portion of the vehicle body viewed from a side. FIG. 7 is a view showing a cross section of a subframe fastening portion and a view showing a cross section taken along B-B in FIG. 3.

The subframe fastening portion 60 is provided at a position aligned with the rear side link portion 41 to which the rear cross member 40 is linked in the front-rear direction of the rear side frame 10, and is provided as a protruding portion formed by protruding a lower wall 14 of the rear side frame 10 downward. The subframe fastening portion 60 includes a first link member 61 that links the inner side wall 13 of the rear side frame 10 and the rear floor panel 3, and a second link member 62 disposed to straddle the lower wall 14 of the rear side frame 10 and the first link member 61. In FIG. 4, the second link member 62 of the subframe fastening portion 60 and the rear floor panel 3 are omitted. The first link member 61 is mounted so as to cover the rear side link portion 41 to which the rear side frame 10 and the rear cross member 40 are linked from its lower surface side, and is joined to the lower wall 14 and the inner side wall 13 of the rear side frame 10 by welding and joined to the lower surface of the rear floor panel 3 by welding. Also, as shown in FIG. 3, the first link member 61 has a shape in which a width dimension in the front-rear direction gradually decreases inward in the vehicle width direction from the rear side frame 10, and its inner side in the vehicle width direction extends along the longitudinal direction of the rear cross member 40. Moreover, the first link member 61 has a ridge-shaped first ridgeline 61a extending in the vehicle width direction, and the first ridgeline 61a extends along the longitudinal direction of the rear cross member 40 from the rear side frame 10 inward in the vehicle width direction.

The second link member 62 is mounted so as to cover the lower wall 14 of the rear side frame 10 and the first link member 61 from their lower surface sides, and is joined to the lower wall 14 and the outer wall 12 of the rear side frame 10 by welding and joined to the lower surface side of the first link member 61 by welding. As shown in FIG. 6, the second link member 62 has a cross section formed into a protrusion projecting downward from the lower wall 14 of the rear side frame 10, and a lower end surface of the second link member 62 serves as a planar subframe fastening surface 62b to which the subframe 5 is fastened. Moreover, as shown in FIGS. 4 to 7, between the lower wall 14 of the rear side frame 10 and the subframe fastening surface 62b of the second link member 62, a cylindrical boss member 70 whose axial direction extends vertically is installed. The boss member 70 passes through the lower wall 14 of the rear side frame 10 and a stiffener 15 provided inside the rear side frame 10 from the subframe fastening surface 62b to the upper side. In the boss member 70, a welded portion 16 provided on the outer periphery near an upper end portion (not shown) is joined to the stiffener 15 by welding (MIG welding). On the other hand, a joint portion between a lower end portion (not shown) of the boss member 70 and the subframe fastening surface 62b is not welded. The subframe fastening surface 62b is provided with an opening portion 62c, and the subframe 5 is fastened and fixed to the boss member 70 through the opening portion 62c.

Further, as shown in FIGS. 3 to 5, the second link member 62 also has a shape in which a width dimension in the front-rear direction gradually decreases inward in the vehicle width direction from the rear side frame 10, and its inner side in the vehicle width direction extends along the longitudinal direction of the rear cross member 40. Moreover, the second link member 62 has a ridge-shaped second ridgeline 62a extending in the vehicle width direction, and the second ridgeline 62a also extends along the longitudinal direction of the rear cross member 40 from the rear side frame 10 inward in the vehicle width direction. Therefore, the second ridgeline 62a extends in the vehicle width direction from the subframe fastening surface 62b to the rear floor panel 3, and the first ridgeline 61a of the first link member 61 and the second ridgeline 62a of the second link member 62 are disposed to be continuous with each other.

Further, as shown in FIG. 2, the reinforcement frame 80 joined to the rear cross member 40 is positioned inward than the subframe fastening portion 60 in the vehicle width direction.

A rear structure of vehicle body of this embodiment includes the rear floor panel 3 constituting the floor portion 2 at the rear portion of the vehicle body 1, the rear side frame 10 extending in the front-rear direction of the vehicle body 1 outside the rear floor panel 3 in the vehicle width direction; and the subframe 5 installed below the rear floor panel 3 to support suspension components. Moreover, the rear side frame 10 includes the subframe fastening portion 60 to which the subframe 5 is fastened, and the subframe fastening portion 60 links the rear side frame 10 and the rear floor panel 3.

According to the rear structure of the vehicle body 1 of this embodiment, the rear side frame 10 and the rear floor panel 3 is linked by the subframe fastening portion 60 of the rear side frame 10, such that a load input from the subframe 5 to the rear side frame 10 can be distributed to the rear side frame 10 and the rear floor panel 3 by this subframe fastening portion 60. Therefore, connection strength of the subframe 5 can be effectively improved, and the strength required at the rear portion of the vehicle body 1 can be ensured.

Moreover, in this embodiment, the rear wheel house 50 disposed outside the rear side frame 10 in the vehicle width direction; and the rear cross member 40 extending inward in the vehicle width direction from the rear wheel house 50 on an upper surface side of the rear floor panel 3 are provided, and the subframe fastening portion 60 is joined to the rear cross member 40 via the rear floor panel 3.

According to this configuration, the subframe fastening portion 60 is joined to the rear cross member 40 extending inward in the vehicle width direction from the rear wheel house 50, such that the load input from the subframe 5 can also be distributed to the rear cross member 40, thus the connection strength of the subframe 5 can be further improved.

Further, in this embodiment, the subframe fastening portion 60 includes the first link member 61 that links the inner side wall 13 of the rear side frame 10 and the rear floor panel 3.

According to this configuration, the first link member 61 that links the rear side frame 10 and the rear floor panel 3 is provided, such that the load input from the subframe 5 to the rear side frame 10 can be distributed and transmitted to the rear cross member 40 and the rear floor panel 3 via the first link member 61. Therefore, the displacement of the rear side frame 10 in the same direction (tilting inward in the vehicle width direction) against the load applied to the rear side frame 10 inward in the vehicle width direction can be suppressed, thus the connection strength of the subframe 5 can be effectively improved.

Further, in this embodiment, the subframe fastening portion 60 includes the second link member 62 that is installed to straddle the lower wall (lower side wall portion) 14 of the rear side frame 10 and the first link member 61.

According to this configuration, the second link member 62 disposed to straddle the lower wall 14 of the rear side frame 10 and the first link member 61 is provided, such that the load input from the subframe 5 can be distributed to the first link member 61 and the rear side frame 10 by the second link member 62, and the connection strength of the subframe 5 can be further improved.

Moreover, in this embodiment, the first link member 61 is linked to the inner side wall 13 and the lower wall 14 of the rear side frame 10, and has a shape in which the width dimension in the front-rear direction decreases inward in the vehicle width direction from the rear side frame 10.

According to this configuration, in addition to having a shape in which the width dimension in the front-rear direction gradually decreases inward in the vehicle width direction, the first link member 61 is linked to the inner side wall 13 and the lower wall 14 of the rear side frame 10, such that the load input from the subframe 5 can be distributed, and the load input from the rear side frame 10 to the first link member 61 can be efficiently transmitted by the rear cross member 40 and the rear floor panel 3. Therefore, displacement of the rear side frame 10 in the same direction (tilting inward in the vehicle width direction) against the load applied to the rear side frame 10 inward in the vehicle width direction can be suppressed more effectively, and the connection strength of the subframe 5 can be further effectively improved.

Further, in this embodiment, the second link member 62 is linked to the first link member 61, and is linked to the lower wall 14 and the outer wall 12 in the vehicle width direction of the rear side frame 10.

According to this configuration, the second link member 62 is linked to the first link member 61 and linked to the lower wall 14 and the outer wall 12 of the rear side frame 10, such that the load input from the subframe 5 to the second link member 62 can be distributed to the first link member 61 and the rear side frame 10, and the connection strength of the subframe 5 can be further improved.

Moreover, in this embodiment, the first ridgeline 61a provided on the first link member 61; and the second ridgeline 62a provided on the second link member 62 and extending from the subframe fastening surface 62b in the subframe fastening portion 60 to the rear floor panel 3 are provided, and the first ridgeline 61a and the second ridgeline 62a are disposed to be continuous with each other.

According to this configuration, the second ridgeline 62a extending from the subframe fastening surface 62b of the second link member 62 to the rear floor panel 3 is disposed to be continuous with the first ridgeline 61a of the first link member 61, such that the load input from the subframe 5 can be smoothly transmitted to the first link member 61 and the rear cross member 40, the connection strength of the subframe 5 can be further improved.

Further, in this embodiment, the reinforcement frame 80 positioned inward than the subframe fastening portion 60 in the vehicle width direction is provided, and the reinforcement frame 80 extends in the front-rear direction of the vehicle body 1 and intersects the rear cross member 40.

According to this configuration, the reinforcement frame 80 positioned inward than the subframe fastening portion 60 in the vehicle width direction, and since the reinforcement frame 80 extends in the front-rear direction of the vehicle body and intersects the rear cross member 40, the load from the subframe 5 input to the rear cross member 40 can be transmitted to the reinforcement frame 80, and the connection strength of the subframe 5 can be further improved. Although the embodiments of the disclosure have been described above, the disclosure is not limited to the above embodiments, and various modifications are possible within the scope of the technical ideas described in the claims, specification and drawings.

What is claimed is:
1. A rear structure of vehicle body, comprising:
a floor panel constituting a floor portion at a rear portion of a vehicle body;
a rear side frame extending in a front-rear direction of the vehicle body outside the floor panel in a vehicle width direction; and
a subframe installed below the floor panel and supporting suspension components,
wherein the rear side frame comprises a subframe fastening portion to which the subframe is fastened, and the subframe fastening portion links the rear side frame and the floor panel.

2. The rear structure of vehicle body according to claim 1, comprising:
   a wheel house disposed outside the rear side frame in the vehicle width direction; and
   a cross member extending inward in the vehicle width direction from the wheel house on an upper surface side of the floor panel,
   wherein the subframe fastening portion is joined to the cross member via the floor panel.

3. The rear structure of vehicle body according to claim 2, wherein the subframe fastening portion comprises a first link member that links an inner side wall portion of the rear side frame in the vehicle width direction and the floor panel.

4. The rear structure of vehicle body according to claim 3, wherein the subframe fastening portion comprises a second link member installed to straddle a lower side wall portion of the rear side frame and the first link member.

5. The rear structure of vehicle body according to claim 4, wherein the first link member
   is linked to the inner side wall portion and the lower side wall portion of the rear side frame, and
   has a shape in which a width dimension in the front-rear direction decreases inward in the vehicle width direction from the rear side frame.

6. The rear structure of vehicle body according to claim 4, wherein the second link member is linked to the first link member, and is linked to the lower side wall portion and an outer side wall portion in the vehicle width direction of the rear side frame.

7. The rear structure of vehicle body according to claim 4, comprising:
   a first ridgeline provided on the first link member; and
   a second ridgeline provided on the second link member and extending from the subframe fastening surface in the subframe fastening portion to the floor panel,
   wherein the first ridgeline and the second ridgeline are disposed to be continuous with each other.

8. The rear structure of vehicle body according to claim 2, comprising:
   a reinforcement frame positioned inward than the subframe fastening portion in the vehicle width direction,
   wherein the reinforcement frame extends in the front-rear direction of the vehicle body and intersects the cross member.

\* \* \* \* \*